No. 658,739. Patented Sept. 25, 1900.
F. KRAEMER.
COIN SETTING ELECTRIC METER.
(Application filed Nov. 6, 1899.)
(No Model.) 9 Sheets—Sheet 5.
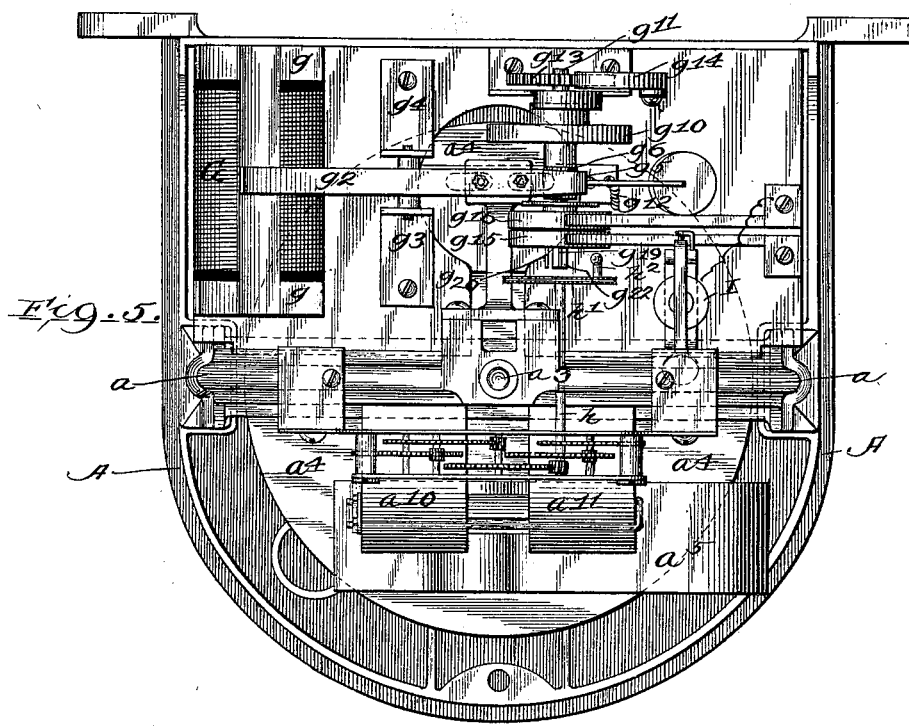
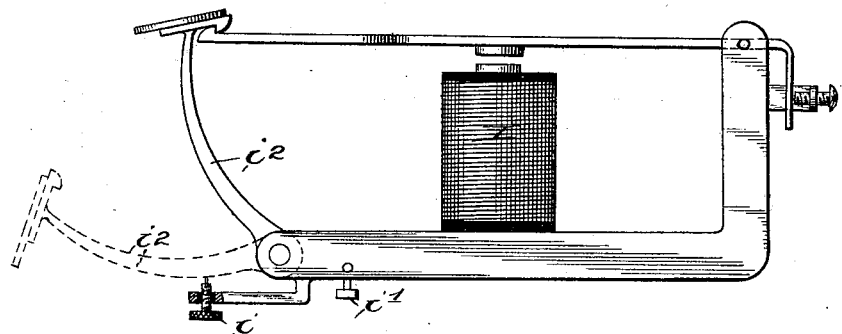
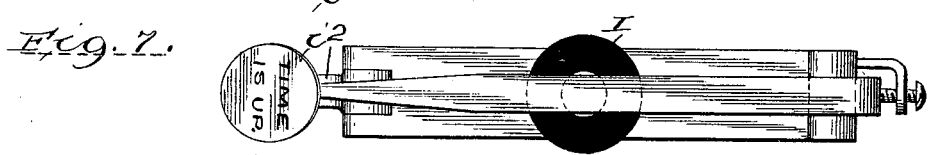

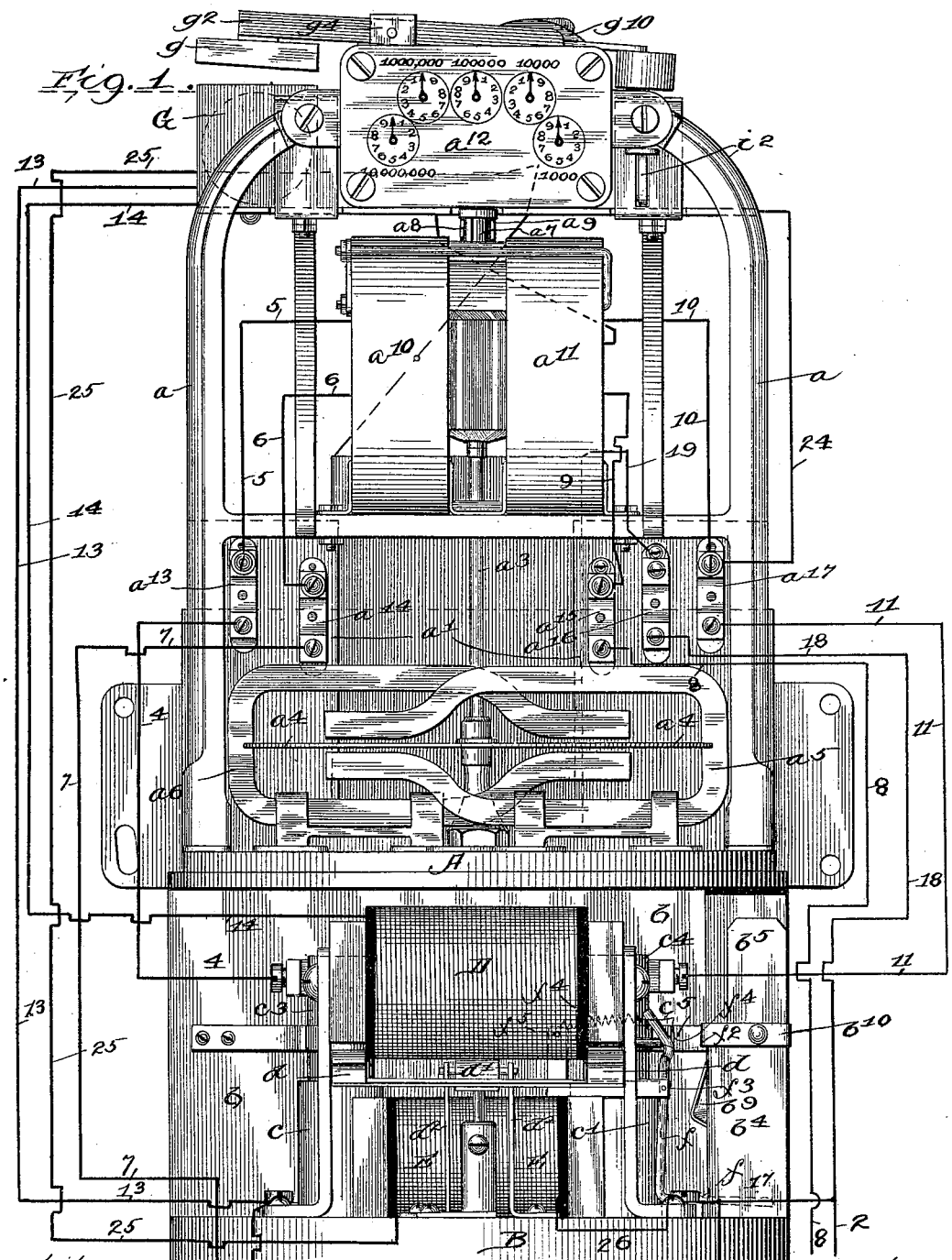

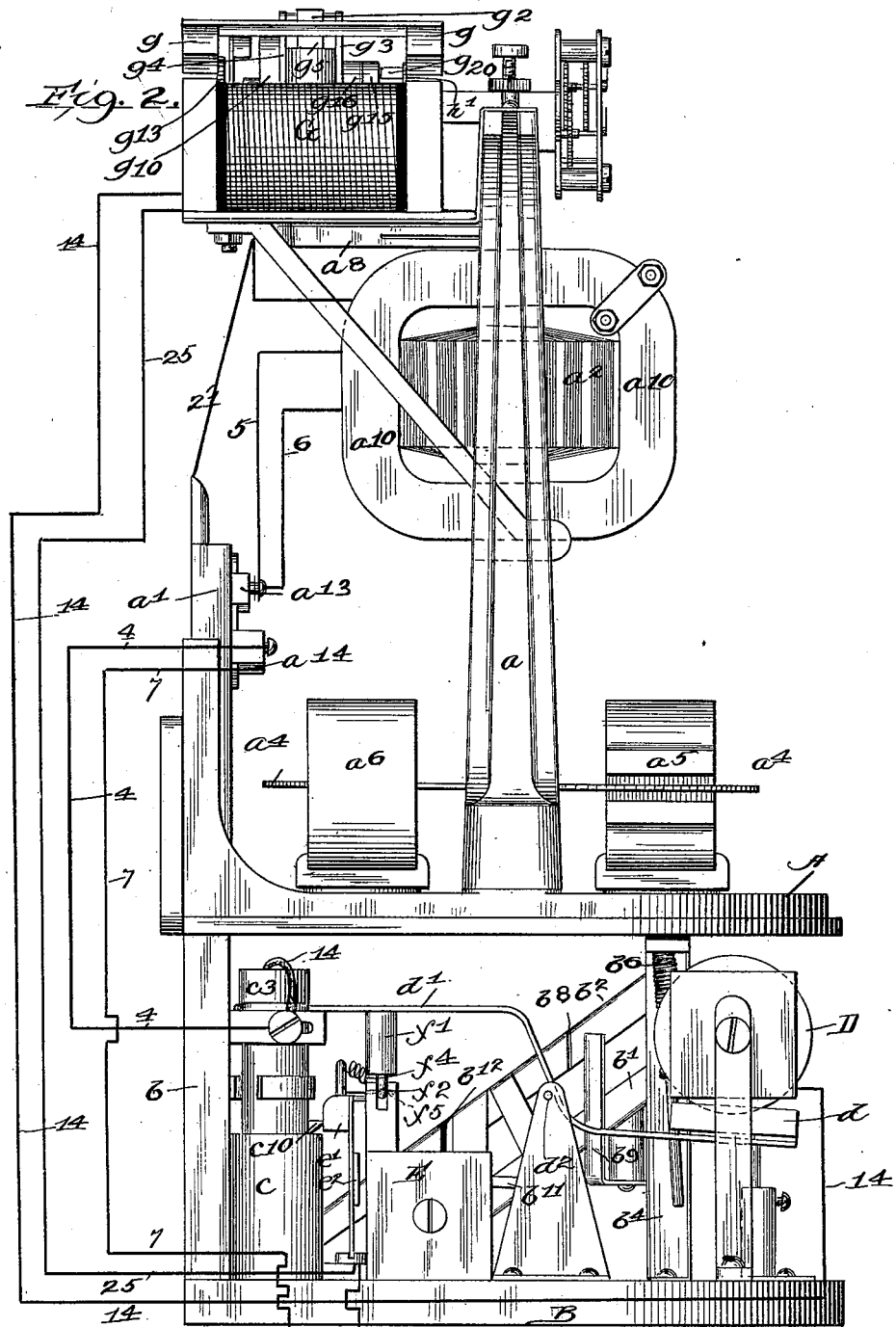

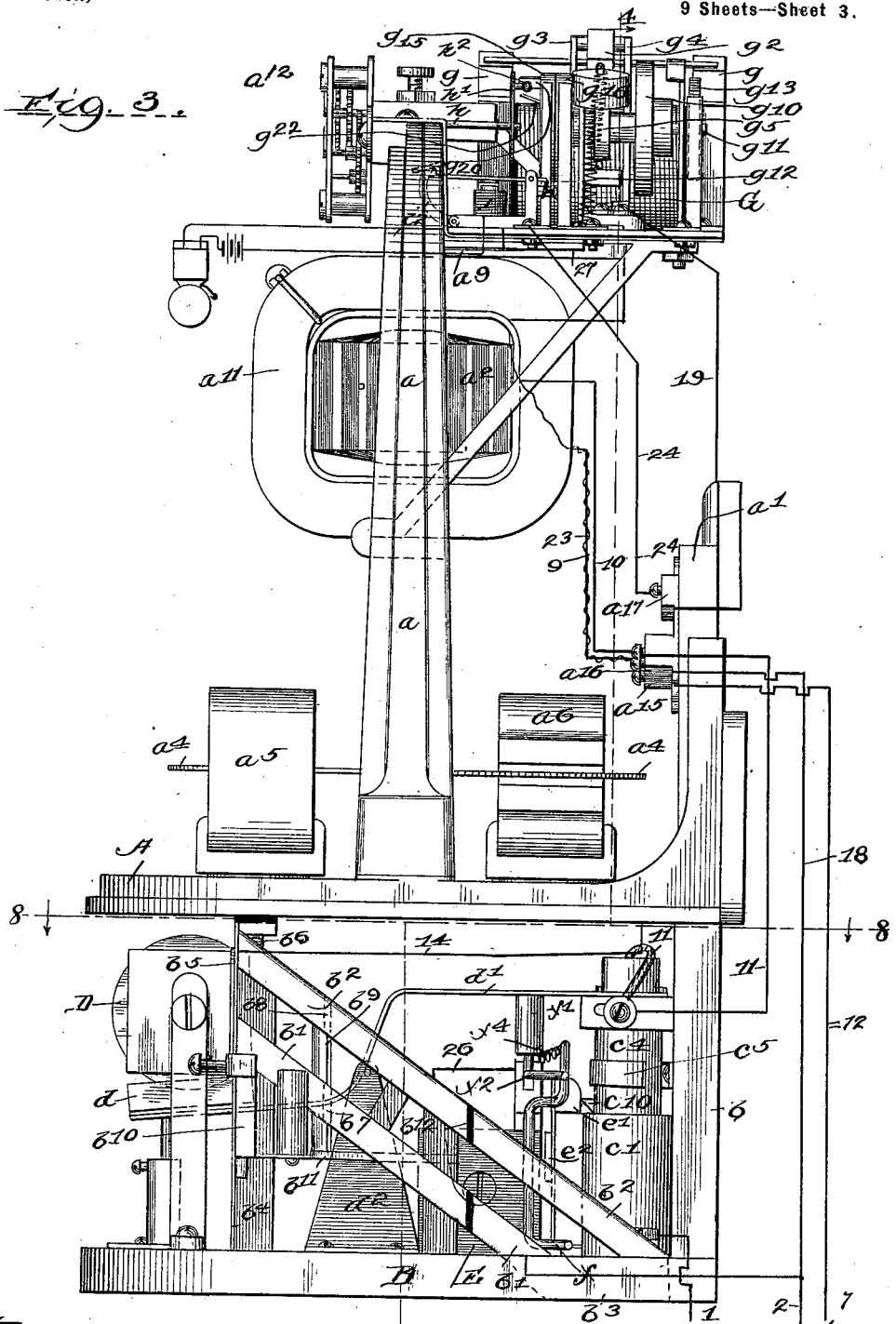

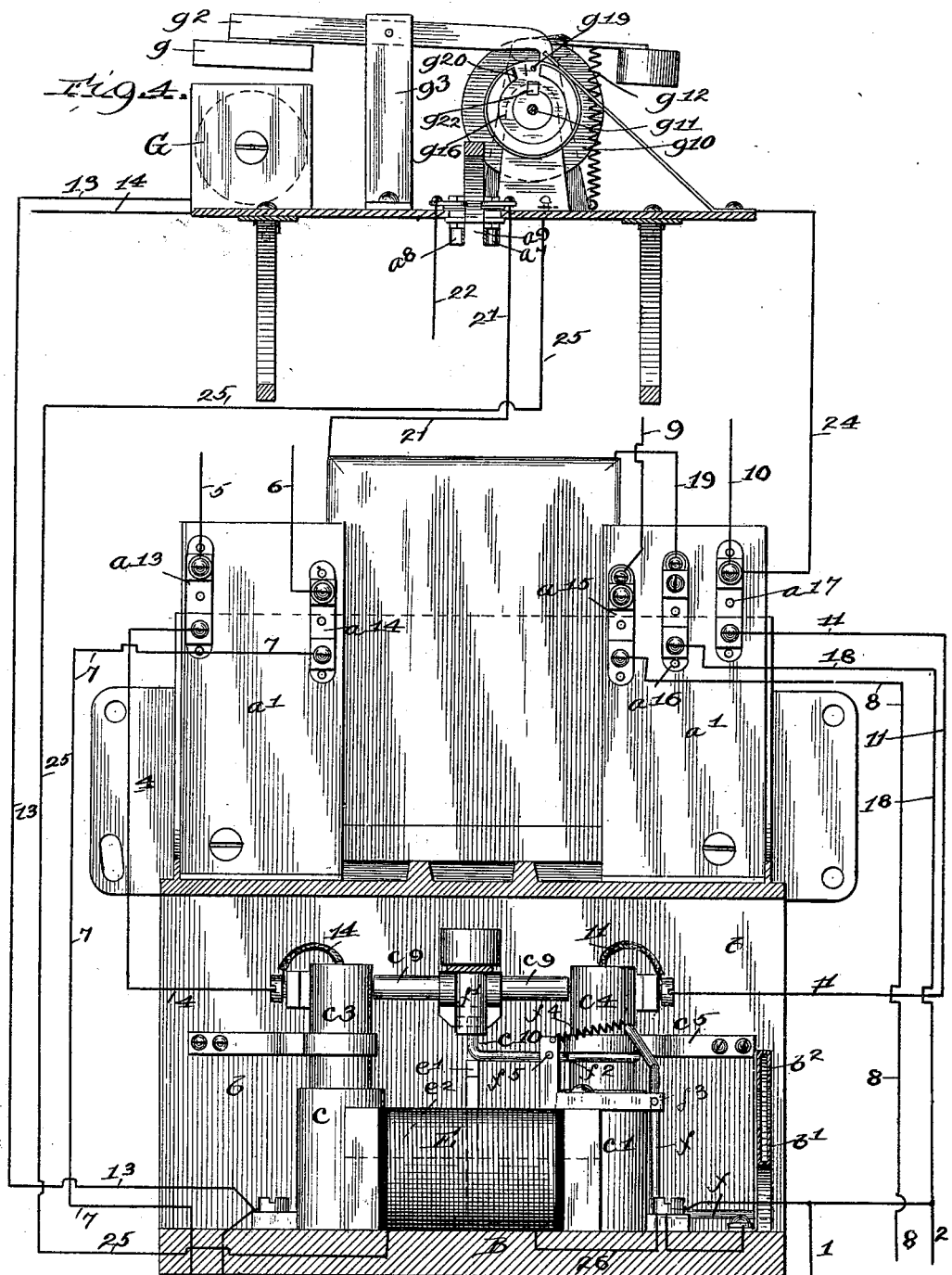

No. 658,739. Patented Sept. 25, 1900.
F. KRAEMER.
COIN SETTING ELECTRIC METER.
(Application filed Nov. 6, 1899.)
(No Model.) 9 Sheets—Sheet 6.
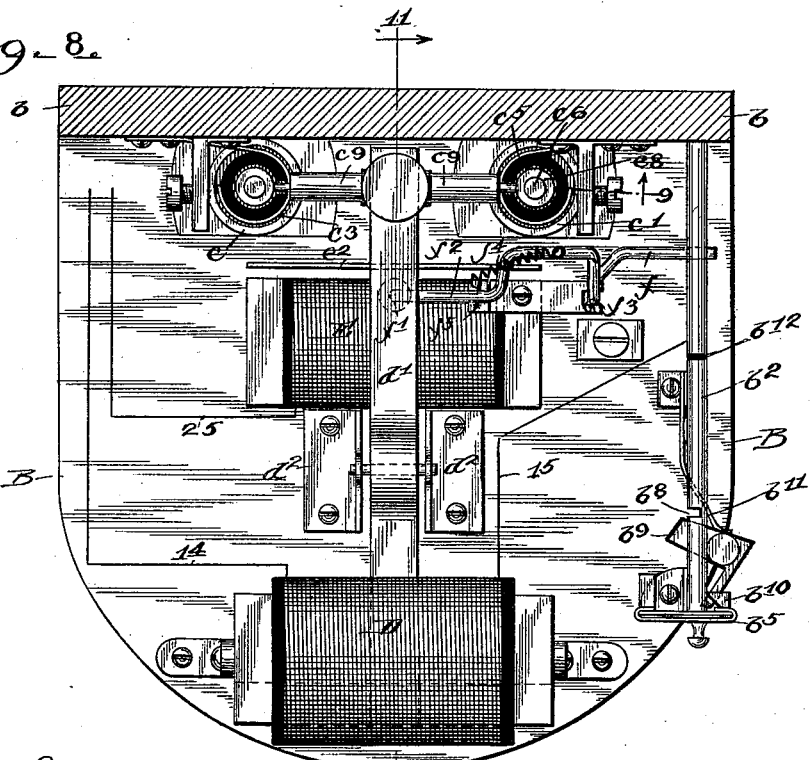
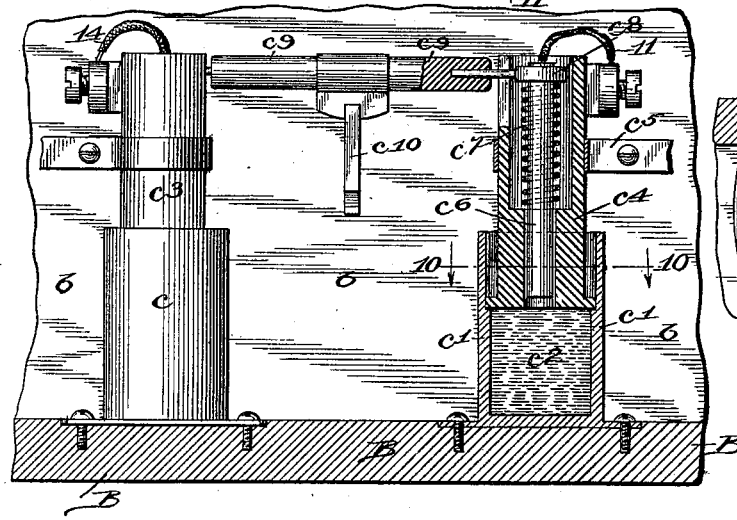
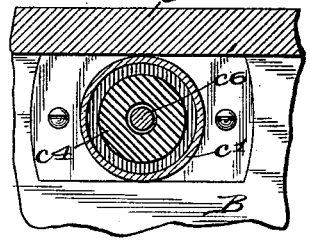
Witnesses:
Inventor:
Frank Kraemer,
By
Attorney No. 658,739. Patented Sept. 25, 1900.
F. KRAEMER.
COIN SETTING ELECTRIC METER.
(Application filed Nov. 6, 1899.)
(No Model.) 9 Sheets—Sheet 7.

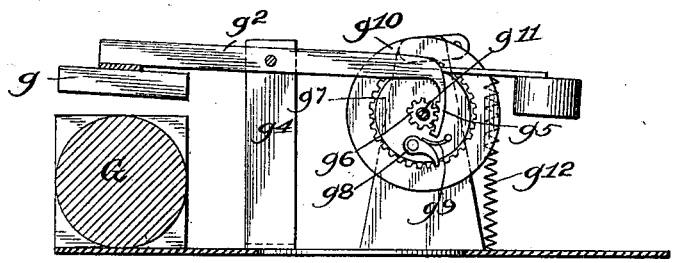
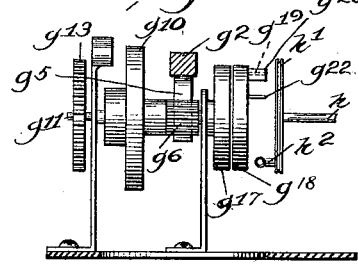
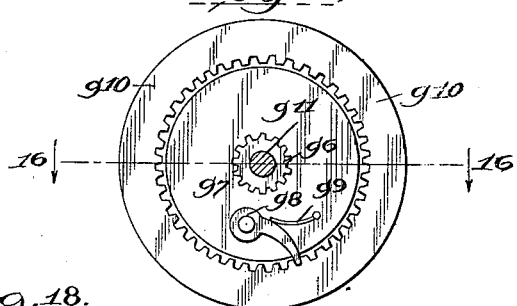
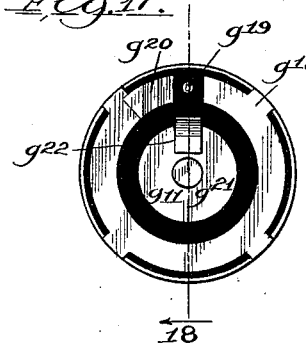
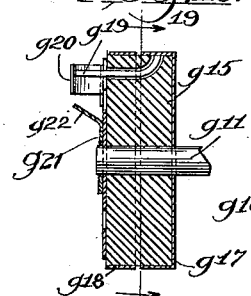
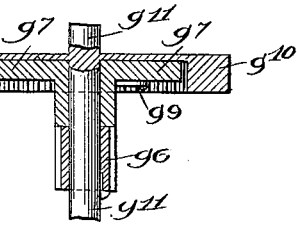
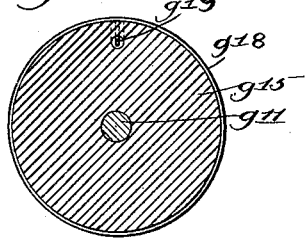

No. 658,739. Patented Sept. 25, 1900.
F. KRAEMER.
COIN SETTING ELECTRIC METER.
(Application filed Nov. 6, 1899.)
(No Model.) 9 Sheets—Sheet 9.

Witnesses:
Inventor:
Frank Kraemer,
By Toree Bain
Attorney

THE NORRIS PETERS CO., PHOTO-LITHO., WASHINGTON, D. C.

UNITED STATES PATENT OFFICE.

FRANK KRAEMER, OF CHICAGO, ILLINOIS.

COIN-SETTING ELECTRIC METER.

SPECIFICATION forming part of Letters Patent No. 658,739, dated September 25, 1900.

Application filed November 6, 1899. Serial No. 735,946. (No model.)

*To all whom it may concern:*

Be it known that I, FRANK KRAEMER, a citizen of the United States, residing in Chicago, county of Cook, and State of Illinois, have invented certain new and useful Improvements in Coin-Setting Electric Meters; and I do hereby declare the following to be a full, clear, and exact description, such as will enable persons skilled in the art to make and use the same.

My invention relates to improvements in prepayment electric meters, and especially those wherein a coin when dropped within a slot communicating with the mechanism thereof will close a circuit or cause a circuit to be closed, which will set into operation a mechanism necessary to close a switch in the main or working circuit through the translating devices and at the same time it will set ahead an electric contact, which when reached by the registering mechanism of the meter will close a circuit, whereby the said main switch will be opened. The contact will be set ahead to the extent that the number of kilowatts delivered into the circuit in which the meter is placed will correspond with the value of the coin at the rate charged for the electric energy.

My invention has especial reference to the coin-operating mechanism and not to the construction of the meter in any sense.

My device may be applied to any meter; and it consists, essentially, in certain circuits and mechanisms hereinafter more particularly described, and specifically pointed out in the appended claims.

Figure 11:
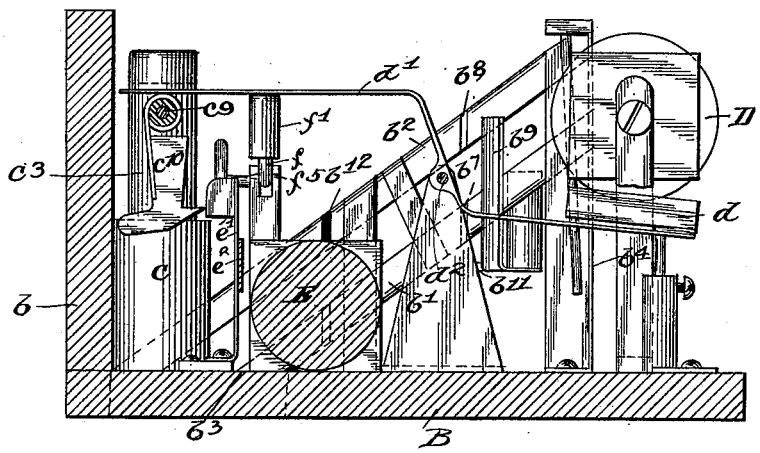
Figure 12:
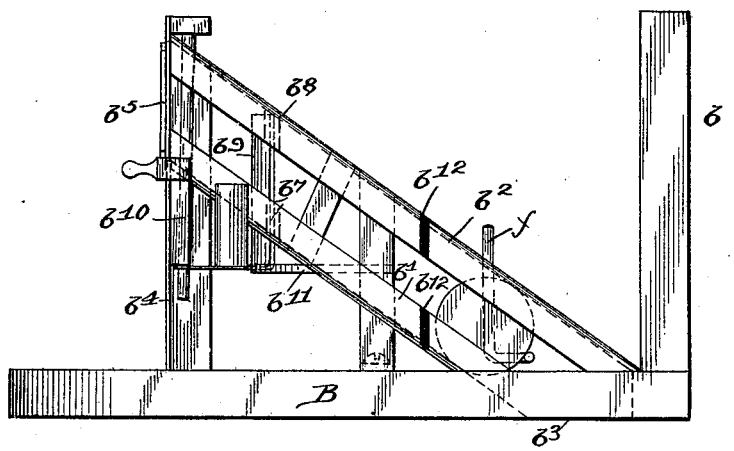
Figure 20:
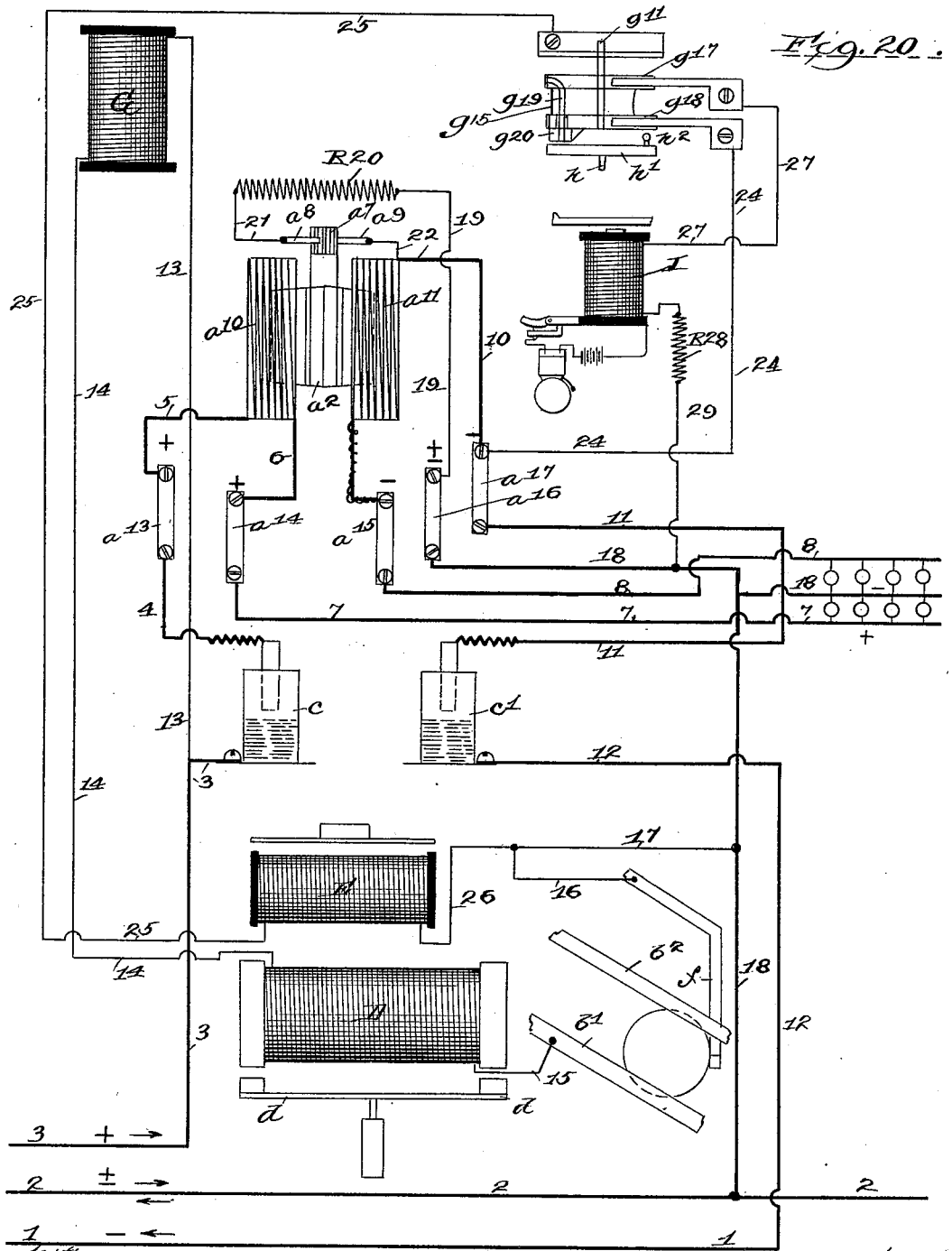

In the drawings, Figure 1 is a front elevation of an electric wattmeter, showing my coin operating and prepayment attachment. Fig. 2 is a side elevation looking from the left-hand side of Fig. 1. Fig. 3 is a side elevation looking from the right-hand side. Fig. 4 is a vertical section taken on line 4 4 of Fig. 3. Fig. 5 is a view looking from above. Figs. 6 and 7 are side and top views of an indicator. Fig. 8 is a section taken through line 3 3 of Fig. 3. Fig. 9 is an elevation, one side in section, of the main switch. Fig. 10 is a section of same, taken on line 10 10 of Fig. 9. Fig. 11 is a section taken through line 11 11 of Fig. 8. Fig. 12 is a detail elevation of the coin-chute and movable coin-release and circuit-terminal piece. Fig. 13 is a detail of the mechanism, in front elevation, for setting the releasing-contact ahead for operating the switch. Fig. 14 is a side elevation of same. Fig. 15 is an enlarged detail of the internal ratchet-wheel shown in Fig. 13. Fig. 16 is a section through line 16 16 of Fig. 15. Fig. 17 is a detail of the two insulated conducting-rings and contacts shown in Fig. 14. Fig. 18 is a section of same through line 18 18 of Fig. 17. Fig. 19 is a section taken through line 19 19 of Fig. 18. Fig. 20 is a diagram of circuits and connections.

Like letters and figures indicate similar parts in all of the views.

A is the base of an ordinary registering wattmeter. $a$ is the supporting-frame rising from the said base. $a'$ is the back support of the said wattmeter.

$a^2$ is the armature; $a^3$, the shaft of said armature; $a^4$, the dampening-disk, fixed to said shaft; $a^5$ and $a^6$, dampening-magnets; $a^7$, the commutator; $a^8$ $a^9$, the commutator-brushes, and $a^{10}$ $a^{11}$ the field-magnets.

$a^{12}$ is the registering-index, connected to the shaft $a^3$ by the usual method.

$a^{13}$ $a^{14}$ $a^{15}$ $a^{16}$ $a^{17}$ are the usual terminals for the wattmeter.

$R^{20}$ is a resistance included in circuit with the armature.

The above-described apparatus and parts comprise a wattmeter of the direct-current three-wire type.

The apparatus and parts which I will now proceed to describe comprise my improved attachment whereby the said wattmeter may be set in operation and the circuit closed through a working circuit for a predetermined watt time by the operation of a coin to be dropped within a receptacle prepared for its reception.

I will first describe the mechanism and system for starting the meter, closing the switch, and setting ahead for a predetermined distance a means for opening the switch. I will then describe in detail the said means for opening the switch, and thereby shutting off the current.

To the bottom of the meter A a base-piece B, having an upright $b$, Fig. 12, is attached. A coin-chute composed of two parallel U- shaped angularly-disposed bars $b'$ $b^2$ rises from above a coin-slot $b^3$ in the base B and terminates against an upright $b^4$, in which a similar slot for the insertion of the coin is provided. A vertically-movable slide $b^5$ covers said slot and is held in a raised position by the closed spiral spring $b^6$. Slots $b^7$ and $b^8$ are cut partly through the bars $b'$ $b^2$, respectively, as shown in Fig. 11. An oscillating blade $b^9$ is adapted to enter said slots when the slide $b^5$ is pulled down and the coin entering slot is exposed. A wedge-shaped piece $b^{10}$ engages with an extended leaf-spring $b^{11}$ of the blade $b^9$ and forces said blade within the slots $b^7$ and $b^8$ when the piece $b^5$ is pulled down to insert the coin. The blade $b^9$ is returned to its position by means of the flat leaf-spring $b^{11}$ when $b^5$ is released and is again raised by means of spiral spring $b^6$. When the coin is inserted within the slot uncovered by plate $b^5$, the blade $b^9$ prevents it from rolling farther down the chute until $b^5$ has been raised and the slot covered thereby, when the coin will then be released.

The coin-chute bars $b'$ $b^2$ are severed and insulation-sections are inserted at $b^{12}$.

A main-line switch is shown in Figs. 8 and 9. The stationary terminals of the switch consist of two cups $c$ and $c'$, preferably made of iron. The cups are partly filled with mercury $c^2$. Slotted insulating guide-tubes $c^3$ $c^4$ rest upon shoulders in the respective cups and are clamped near their upper ends against the vertical back piece $b$ by means of clamp $c^5$. The electrodes $c^6$ comprise the movable terminals of the switch and are held in an upward position normally out of contact with the mercury $c^2$ contained within the cups $c$ $c'$ by means of the open spiral springs $c^7$. Collars $c^8$ surround the movable terminals $c^6$ and provide abutments for the springs $c^7$. The insulated flexible conducting-wires 11 and 14 are connected to the terminals $c^6$ by means of these collars. The insulated cross-arms $c^9$ are attached to the respective terminals $c^6$ by means of pins extending laterally from the collars $c^8$. A detent or latch lever $c^{10}$ depends from the cross-arm $c^9$. It is shown more plainly in Fig. 11.

The magnet D when energized lifts its responsive armature $d$, to which the lever $d'$ is attached. This lever is pivoted at $d^2$, the extended end resting upon the cross-bar $c^9$ of the double-pole main switch just described. When the armature $d$ is lifted, as described, the extended end of the lever $d'$ is thereby depressed against the effort of the springs $c^7$, when the terminals $c^6$ will be thereby plunged into the mercury $c^2$ contained in the cups $c$ and $c'$ and the main switch will be thereby closed. When the movable terminals of the switch and the cross-bars $c^9$, from which the detent or latch lever $c^{10}$ is suspended, are depressed, the said latch $c^{10}$ is made to engage with a similar latch $e'$, attached to the armature $e$ of the magnet E, which at the time is not energized, and by this means the switch is held closed after the current has been withdrawn from magnet D. When the magnet E becomes energized, it will attract its armature $e$, and thereby unlatch or disconnect the elements of the latching device, composed of the detents $c^{10}$ and $e'$, and the springs $c^7$ will force the terminals $c^6$ upwardly and break the electric connection that has been established between the terminals $c^6$ and $c^2$. The lever $d'$ also bears upon the insulated top piece $f'$, which caps the upper end of the lever $f^2$.

The coin-releasing device is composed of two members—levers $f$ and $f^2$. The member $f$ is pivoted at $f^3$. The lower end is bent outwardly and extends into the path of the coin between the pieces composing the coin-chute, Fig. 12. The upper end is bent obliquely in an opposite direction until it reaches over the end of the lever $f^2$. The latter is bent at right angles at this point. (See Fig. 4.) The spring $f^4$ is connected to the upper end of the lever $f$ and to a stationary part of the frame of the instrument. The tension of the spring $f^4$ maintains the lower end of the lever $f$ raised and outwardly extended and within the path of the coin. The lever $f^2$ is pivoted at $f^5$. The outwardly-extending end of this lever is held depressed and the inwardly-extending end is held in a raised position by the effect of the oblique end of the lever $f$ bearing against the angular end of the lever $f^2$ against the resilience of the spring $f^4$, all of which is plainly shown in Figs. 1 and 4. When the upwardly-extended end of the lever $f^2$ is depressed by the lever $d'$, the lower end of the lever $f$ is drawn inwardly by the effect of the outwardly-extending end of the lever $f^2$ pressing against the obliquely-bent portion of the lever $f$ against the tension of the spring $f^4$. When the lever $d'$ is depressed at the point above $f'$, the extended end of the lever $f$ is thereby withdrawn from the path of the coin from the position shown in Fig. 8. It is restored to its normal position by spring $f^4$ when lever $d'$ is raised, when the magnet D becomes deënergized.

The magnet G is in series circuit with the switch-closing magnet D. This magnet is designed to control the operation of the meter through the instrumentality of the coin by setting a contact ahead, which when reached by the registering mechanism will form part of a circuit that will thereby be closed and which contains the releasing-magnet E. By the energizing of the magnet E the main-line switch will be opened, when its armature $e^2$ is attracted thereby and the detents $e'$ and $c^{10}$ will be disengaged. Armature $g$ of the magnet G is fixed to a lever $g^2$, which is pivoted in the uprights $g^3$ $g^4$. (See Figs. 4, 5, and 13.) The extended end of the lever $g^2$ terminates in a curved rack $g^5$, (see Fig. 13,) and this rack engages with a pinion $g^6$, which is fixed to a disk $g^7$. Said disk carries a pawl $g^8$, Fig. 15. The latter is held against the internal teeth of the wheel $g^{10}$ by the spring $g^9$. The pinion $g^6$ and disk $g^7$ are loosely supported upon the shaft $g^{11}$. The disk $g^7$ is adapted to be rotated on the shaft $g^{11}$ by means of the lever $g^2$ and the spiral spring $g^{12}$, which is attached thereto. The wheel $g^{10}$ is fixed to shaft $g^{11}$. A ratchet-wheel $g^{13}$ is also fixed to the said shaft, and a stationary pawl $g^{14}$ (see Fig. 5) engages with the ratchet-teeth that are cut around its face. An insulation-wheel $g^{15}$ is fixed to the shaft $g^{11}$. Two metal electric conducting-rings $g^{17}$ $g^{18}$ surround the wheel $g^{15}$. $g^{17}$ and $g^{18}$ are insulated from the shaft. A small flexible metallic conducting-tongue $g^{19}$ is attached to $g^{17}$ and passes through a hole cut into the insulation portion of $g^{15}$ and projects beyond the side face thereof, as shown in Fig. 18, just in front of the laterally-extended contact-piece $g^{20}$. A metal disk $g^{21}$ is fixed to the shaft $g^{11}$ and is provided with a lateral upwardly-projecting metallic piece $g^{22}$. The second dial-wheel in the train of index-wheels is mounted upon a shaft $h$, which extends back of the dial in line with shaft $g^{11}$, and is provided with a disk $h'$, which carries a projection $h^2$. The projection $h^2$ is capable of making electric contact first with tongue $g^{19}$, and then $g^{20}$ and $g^{22}$, when the disk $h'$ has been revolved by the shaft $h$. The shaft of the index-wheel that indicates watts in units of ten thousand is extended in this case, but the shaft of any one of the index-wheels might be extended for the purpose.

In Figs. 3, 6, and 7 an annunciator is shown. The object of this is to announce to the user the fact that the quantity of electric energy for which he has paid has been delivered and that if he desires a continuation of the service it will be necessary to drop in another coin. By this means the service may be continued without interruption beyond the time purchased by the first coin. An ordinary call-bell circuit may be connected with the terminals $i$ $i'$, so that when the lever $i^2$ drops the bell will be rung by closing the circuit in which the bell is placed between lever $i^2$ and screw $i$, as shown in detailed lines in Fig. 6.

The use and operation of my invention I will now proceed to describe.

In the drawings all of the electrical parts are shown in the position they occupy when the current is turned off and the circuit through the meter is open. In Fig. 1 the slide $b^5$ is shown in position covering the slot for the entrance of the coin into the chute $b'$ $b^2$. When the slide $b^5$ is pulled down, the slot is exposed and the operation of pulling down the slide $b^5$ causes the blade $b^9$ to enter the slots of the chute, which protects the contact $f$ against interference through the said slot. When the coin is inserted within the slot, it rolls downward, and rests against blade $b^9$ until the slide $b^5$ is released, when it will return to its normal position and blade $b^9$ will be withdrawn in the manner hereinbefore explained. The coin will then roll down until it makes contact with lever $f$, which completes the circuit. Referring to Fig. 20, from neutral wire 2 over wire 18, wire 17 and 16 to lever $f$, thence through the coin to bar $b'$, wire 15, switch-closing coil D, through wire 14, contact-setting coil G, and thence through wire 13 to the wire 3. This forms the path of the first circuit established. When the current in the circuit described passes through coil D, it becomes energized and attracts armature $d$. When this is raised, the lever to which it is attached, being pivoted at $d^2$, is lowered at its rear end, thereby depressing the cross-bar $c^9$ against spring $c^7$ until the contacts within the cups $c$ $c'$ are completed—that is to say, until the main circuit has been thus closed through this switch, when the main circuit is as follows: from wire 3 through cup $c$, wire 4, terminal $a^{13}$, wire 5, coil $a^{10}$, wire 6, terminal $a^{14}$, wire 7, through lamps to wire 8, terminal $a^{15}$, wire 9, coil $a^{11}$, wire 10, terminal $a^{17}$, wire 11, switch-cup $c'$, and wire 12 to wire 1.

Circuit through the armature of the motor is as follows: from terminal $a^{16}$, wire 19, resistance-coil $R^{20}$, wire 21, brush 8, commutator $a^7$ and armature to brush $a^9$, wire 22, fine-wire field-coil $a^{11}$, and small wire 9 to terminal $a^{15}$. When the cross-bar $c^9$ has been depressed in the manner described, the detent $c^{10}$, attached thereto, will become engaged with the detent $e'$ of the armature $e^2$, which is responsive to the releasing-magnet E. The moving elements of the main-line switch will be held closed in this manner after the lever $d'$ has been raised by the retraction of the armature $d$ and the magnet D has become deënergized. The pressure of the lever $d'$ upon the cap $f'$ depresses the lever $f^2$ against oblique end of lever $f$ and against the spring $f^4$. The arm $f$ is thereby withdrawn from the path of the coin and the circuit between $f$ and $b'$ is broken. The coin being released will drop through slot $b^3$, Fig. 12, into any suitable depository that may be prepared for it.

It will be noticed that the circuit cannot be broken by the displacement of the coin until the main circuit has been closed by the main-line switch.

When magnet G becomes energized in the manner described, it attracts its armature $g$, which is fixed to lever $g^2$, the extended rack end of the said lever is raised, and the pinion $g^6$ is thereby rotated, the dog $g^8$ engages with the internal teeth of the disk $g^{10}$, and this being fixed to the shaft $g^{11}$ the shaft is thereby rotated. The wheel $g^{15}$, carried with the shaft, and the contacts $g^{19}$, $g^{20}$, and $g^{22}$ of the said wheel are thereby set ahead of the contact $h^2$ of the disk $h'$, which is fixed to the index-shaft $h$.

By limiting or adjusting the motion of the armature $g$ and the lever $g^2$ the effect of the rack to turn the pinion $g^6$ may be regulated and the contacts may be thereby set ahead a greater or less distance, as may be desired. Any means commonly used for adjusting the motion of an armature before its magnet may be employed for this purpose.

When the coil G becomes deënergized, as when the circuit is broken by the coin leaving the chute, the spring $g^{12}$ will raise the armature $g$ and pull down the rack $g^5$, the dog $g^8$ of the disk $g^7$ will slide over the teeth of the wheel $g^{10}$, and the pawl $g^{14}$ of the wheel $g^{13}$ will prevent the shaft $g^{11}$ from being turned back when the dog passes over the teeth in the manner described.

The limit of movement of the armature $g$ may be adjusted so that the rack will turn the pinion a determined distance, whereby the contacts $g^{19}$, $g^{20}$, and $g^{22}$ will be set ahead a distance to correspond with the value of the coin which it has been previously decided shall be used in the particular meter that is being adjusted. For instance, suppose that it has been determined that a coin of the value of twenty-five cents shall be used in the meter that is being adjusted and that at the rate charged for the electric energy this amount of money will purchase twelve hundred and fifty watt hours, then the lever $g^2$ will be adjusted to move sufficiently to set the aforesaid contacts ahead of the contact $h^2$ a distance that will be traveled by the contact $h^2$ while the meter is measuring off into the working circuit twelve hundred and fifty watts. When two twenty-five-cent pieces are inserted one after the other, the aforesaid distance will be just double that effected by the introduction of one coin, and two thousand five hundred watts will be consumed by the working circuit before the meter will automatically open the main working circuit. The contact $h^2$ will make connection with the tongue $g^{19}$ a few moments before the expiration of the service for which the meter has been set. When the tongue has thus been pressed against the contact $g^{20}$, the circuit will be as follows, Fig. 20: from the neutral wire 18 to wire 29, resistance-coil $R^{20}$, annunciator-coil 1, wire 27, contact-brush of ring $g^{17}$, tongue $g^{19}$, contact $g^{20}$ to wheel $g^{18}$ and its brush, and wire 24 to terminal $a^{17}$, causing the annunciator-shutter $i^2$ to drop for informing the user that "time is up," and if a bell and circuit are included within contacts $i$ and $i'$ the contact of the arm $i^2$ with $i$ will cause the bell to be rung by closing of the bell-circuit. After contact $h^2$ has made connection with the tongue $g^{19}$ it will be moved slightly farther ahead by the operation of the meter mechanism until it has made connection with contact $g^{22}$, and thereby closed electric circuit. From the neutral 2 to wire 18, wire 17 and 26, through releasing-magnet E, wire 25 to the frame of the setting mechanism to shaft $g^{11}$, collar $g^{21}$, contact $g^{22}$, contact $g^{20}$, ring $g^{18}$ and its brush, wire $g^{24}$ to terminal $a^{17}$, wire 11, switch $c'$, and wire 12 to the negative wire 1, thus energizing magnet E, Fig. 11, attracting armature $e^2$, and disengaging the detents $e'$ and $c^{10}$, thereby releasing the moving elements of the main-line switch, which will be raised by their respective open spiral springs, breaking electric contact with the mercury contained within their respective switching-cups $c$ $c'$, and thus opening all of the circuits to which the meter is attached.

I have shown mechanism and circuits necessary for the proper operation of my invention; but I do not wish to be held strictly to the construction shown, as I reserve the right to make such variations in the form and arrangements of the various parts as will fairly fall within the scope and spirit of my invention.

Having described my invention, what I claim, and desire to secure by Letters Patent of the United States, is—

1. In a coin-operated electric meter, a main circuit, a derived circuit adapted to be closed by the instrumentality of a coin, a switch in the main circuit, a magnet for closing said switch, a magnet for operating a toll-measuring device, and a releasing-magnet energized by a circuit closed through the toll-measuring device, substantially as set forth.

2. In a coin-operated electric meter, a main circuit, a derived circuit adapted to be closed by the instrumentality of a coin, a switch in the main circuit, a magnet for closing said switch, and a toll-measuring magnet in a derived circuit, a toll-measuring device and a switch-releasing magnet in another circuit, and a means, operated by the motor mechanism of the meter, for closing the circuit through the said toll-measuring device and the said switch-releasing magnet, substantially as set forth.

3. In a coin-operated electric meter, a main circuit, a switch in the main circuit, a derived circuit containing a switch-closing magnet and a toll-measuring magnet, terminals of said circuit adapted to be electrically connected by a coin, a switch-releasing magnet and a toll-measuring device in a derived circuit, and a traveling circuit-closer operated by the motor mechanism of the meter adapted to close the circuit through the latter derived circuit, substantially as set forth.

4. In a coin-operated electric meter, a main circuit, a switch in the main circuit, a derived circuit containing a switch-closing and a toll-measuring magnet, a derived circuit adapted to be closed and opened by a coin, another derived circuit containing the switch-releasing magnet, and a moving circuit-closer, operated by the motor mechanism of said meter, and adapted to close the circuit through the said switch-releasing magnet, substantially as set forth.

5. In a coin-operated electric meter, a switch-closing magnet, a switch in the main circuit, a toll-setting magnet, an electric circuit containing said magnets, a support for a coin, forming one terminal of said circuit, and a lever within the path of the said coin forming the other terminal of said circuit, said lever adapted to be removed from said path by a magnet in the said circuit when said circuit is closed, substantially as set forth.

6. In a coin-operated electric meter, a main circuit, a switch in the main circuit, a derived circuit, a coin-operated switch for closing said derived circuit, motor mechanism in said derived circuit for closing the switch in the main circuit and for operating a toll-measuring device, another circuit, motor mechanism therein for opening said main-circuit switch, and a traveling contact operated by the index of said meter for closing the latter circuit, substantially as set forth.

7. In a coin-operated electric meter, a main circuit, a switch in the main circuit, a derived circuit containing a switch-closing device, a coin-operated switch for closing said derived circuit, a derived circuit containing a switch-opening device, a circuit containing an indicator, and a circuit-closer adapted to close the latter circuit prior to the time when the circuit containing the switch-opening device is closed, substantially as set forth.

8. In a coin-operated electric meter, a main circuit, a switch in the main circuit, a derived circuit containing switch-closing and meter-setting mechanism, terminals in said circuit adapted to be closed by a coin, a derived circuit containing switch-opening mechanism and terminals in said circuit adapted to be closed by the motor mechanism of the said meter, substantially as set forth.

In testimony whereof I have signed this specification, in the presence of two subscribing witnesses, this 4th day of November, 1899.

FRANK KRAEMER.

In presence of—
  LOUIS G. SMITH,
  M. F. ALLEN.